US009760328B2

(12) United States Patent
Mastie et al.

(10) Patent No.: US 9,760,328 B2
(45) Date of Patent: Sep. 12, 2017

(54) WHITE SPACE MANAGEMENT MECHANISM

(75) Inventors: Scott D. Mastie, Longmont, CO (US); Craig D. Brossman, Durango, CO (US)

(73) Assignee: Ricoh Company, LLC, Tokyo (JP)

(*) Notice: Subject to any disclaimer, the term of this patent is extended or adjusted under 35 U.S.C. 154(b) by 1792 days.

(21) Appl. No.: 12/771,005

(22) Filed: Apr. 30, 2010

(65) Prior Publication Data
US 2011/0267643 A1 Nov. 3, 2011

(51) Int. Cl.
*G06F 3/12* (2006.01)

(52) U.S. Cl.
CPC .......... *G06F 3/1288* (2013.01); *G06F 3/1219* (2013.01); *G06F 3/1244* (2013.01)

(58) Field of Classification Search
USPC .................................................. 358/1.1–3.29
See application file for complete search history.

(56) References Cited

U.S. PATENT DOCUMENTS

| | | | |
|---|---|---|---|
| 5,513,254 A | 4/1996 | Markowitz | |
| 7,190,474 B1 | 3/2007 | Silverbrook et al. | |
| 2002/0165937 A1 | 11/2002 | Nitta et al. | |
| 2003/0071988 A1 | 4/2003 | Smith et al. | |
| 2004/0015396 A1 | 1/2004 | Satomi | |
| 2004/0059435 A1 | 3/2004 | Goldberg et al. | |
| 2004/0095587 A1 | 5/2004 | Brown et al. | |
| 2004/0158655 A1 | 8/2004 | Kremer | |
| 2004/0215559 A1* | 10/2004 | Rebenack | G06Q 20/102 705/40 |
| 2006/0206380 A1 | 9/2006 | Joo | |
| 2007/0115498 A1 | 5/2007 | Noel et al. | |
| 2007/0288843 A1 | 12/2007 | Makino | |
| 2008/0137132 A1* | 6/2008 | Perronnin | G06Q 30/02 358/1.15 |
| 2008/0291486 A1* | 11/2008 | Isles et al. | 358/1.15 |
| 2008/0313035 A1* | 12/2008 | Peeters | G06Q 30/02 705/14.39 |
| 2009/0039583 A1 | 2/2009 | Horn et al. | |

OTHER PUBLICATIONS

"PCT Search Report and Written Opinion", PCT/US2011/033123, (Jul. 27, 2011), 7 pages.
Non-Final Office Action from U.S. Appl. No. 12/770,997 dated Aug. 29, 2012, 11 pages.
Response to Non-Final Office Action as filed on Oct. 4, 2012 for U.S. Appl. No. 12/770,997, 9 pages.

* cited by examiner

*Primary Examiner* — Marcellus Augustin
(74) *Attorney, Agent, or Firm* — Alpine Technology Law Group LLC

(57) ABSTRACT

A computer generated method disclosed. The method includes examining a print job data stream spooled in a spooled print production file, identifying one or more white space regions within documents in the print production file and inserting content into each of the white space regions.

20 Claims, 12 Drawing Sheets

WHITE SPACE MANAGEMENT MECHANISM

FIELD OF THE INVENTION

The invention relates to the field of printing systems. Particularly, the invention relates to identifying and utilizing blank spaces in post production print jobs.

BACKGROUND

Printers are common peripheral devices attached to computers. A printer allows a computer user to make a hard copy of documents that are created in a variety of applications and programs on a computer. To function properly, a channel of communication is established (e.g., via a network connection) between the printer and the computer to enable the printer to receive commands and information from the host computer.

Once a connection is established between a workstation and the printer, printing software is implemented at a print server to manage a print job from order entry and management through the complete printing process. The printing software may simultaneously manage in excess of thousands of print jobs that have been spooled (or queued) for production. Each of these print jobs may include various documents that include unused areas (or white spaces) at which content may be placed, but are left blank as a result of the defined print job data.

In many print applications, the existence of such magnitudes of white space is wasteful. For example, a print job performed by a bank that produces thousands of statements to be mailed to customers may result in hundreds of pages worth of white space. Thus, the bank is unable to maximize the efficiency of print jobs by utilizing unused space on print pages. Since the cost of producing the statements has already been expended at the time of production, the bank could take full advantage of such an investment by having an opportunity to utilize the white space to place content (e.g., advertisements, offers, etc.) for which a consumer may have interest.

Accordingly, a mechanism to identify and utilize white spaces in print jobs is desired.

SUMMARY

In one embodiment a computer generated method is disclosed. The method includes examining a print job data stream spooled in a spooled print production file, identifying one or more white space regions within documents in the print production file and inserting content into each of the white space regions.

In another embodiment, a print server is disclosed. The print server includes a printing software product having a whitespace manager to examine a print job data stream spooled in a spooled print production file stored at the server, identify one or more white space regions within documents in the print production file and insert content into each of the white space regions.

In a further embodiment, a computer system is disclosed. The computer system includes a memory to store a printing software product, a processor, coupled to the memory, to execute the printing software product and a display device to display a graphical user interface (GUI) upon the processor executing the printing product. The GUI includes menu options to enable identification of one or more white space regions within documents in a print production file and selection of content to be inserted in the white space regions.

BRIEF DESCRIPTION OF THE DRAWINGS

A better understanding of the present invention can be obtained from the following detailed description in conjunction with the following drawings, in which.

DETAILED DESCRIPTION

A whitespace management mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
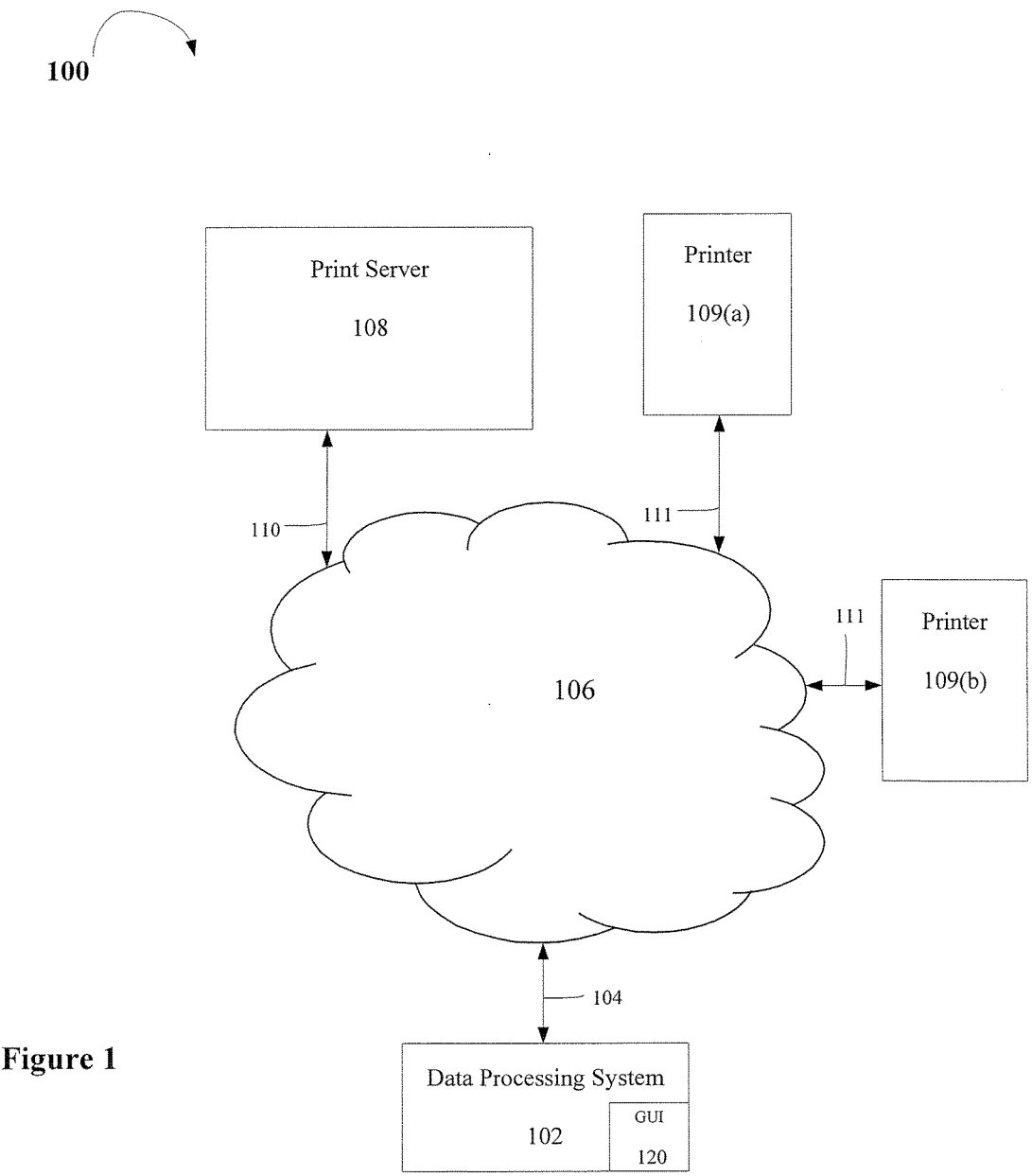
FIG. 1 illustrates one embodiment of a data processing system network.

FIG. 1 illustrates one embodiment of a data processing system network 100. Network 100 includes a data processing system 102, which may be either a desktop or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art. In one embodiment, data processing system 102 includes and employs the Windows operating system, or other operating system, and/or network drivers permitting data processing system 102 to communicate with network 106 for the purposes of employing resources within network 106.

Network 106 may be a local area network (LAN) or any other network over which print requests may be submitted to a remote printer or print server. Communications link 104 may be in the form of a network adapter, docking station, or the like, and supports communications between data processing system 102 and network 106 employing a network communications protocol such as Ethernet, the AS/400 Network, or the like.

According to one embodiment, network 106 includes a print server 108 that serves print requests over network 106 received via communications link 110 between print server 108 and network 106. Print server 108 subsequently transmits the print requests via communications link 110 to one of printers 109 for printing, which are coupled to network 106 via communications links 111.

In one embodiment, a print application at data processing system 102 allows a user to select the desired print server 108 and submit requests for service requests to printer 109 via print server 108 over network 106. In a further embodiment, the print application implements the (Advanced Function Presentation) AFP™ presentation system developed by International Business Machines Corporation to represent documents in a data format that is independent of the methods that are utilized to capture or create those documents.

According to the AFP system, documents may include combinations of text, image, graphics, and/or barcode objects in device and resolution independent formats. Documents may also include and/or reference fonts, overlays, and other resource objects, which are required at presentation time to present the data properly. In other embodiments, additional/alternative presentation architectures may be implemented at the print application.

However in an AFP embodiment, the print application provides a Mixed Object Document Content Architecture (MO:DCA) data stream to print server 108. In such an embodiment, the AFP MO:DCA data streams are object-oriented streams including, among other things, data objects, page objects, and resource objects. In a further embodiment, AFP MO:DCA data streams include a Resource Environment Group (REG) that is specified at the beginning of the AFP document, before the first page. When the AFP MO:DCA data streams are processed by print server 108, the REG structure is encountered first and causes server 108 to download any of the identified resources that are not already present in the printer.

Although described as separate entities, other embodiments may include print server 108 being incorporated in one or more of the printers 109. In yet further embodiments, the print server and printer may be physically separate entities. Therefore, the data processing system network depicted in FIG. 1 is selected for the purposes of explaining and illustrating the present invention and is not intended to imply architectural limitations. Those skilled in the art will recognize that various additional components may be utilized in conjunction with the present invention.

According to one embodiment, print server 108 implements a printing software product that manages the printing of documents from data processing system 102 and one or more of printers 109. In other embodiments, the printing software product manages printing of documents from multiple data processing systems 102 to the one or more printers 109. In one embodiment, the printing software product may be implemented using either InfoPrint Manager (IPM) or InfoPrint ProcessDirector (IPPD), although other types of printing software may be used instead. In a further embodiment, the print application at data processing system 102 interacts with the printing software product to provide for efficient transmission of print jobs.

In one embodiment, the printing software product includes a graphical user interface (GUI) 120 accessible at a data processing system 102 that enables a system administrator (or operator) to interact with the printing software product and print application. In such an embodiment, GUI 120 includes a whitespace manager that records and manages white space identified in documents spooled for production at the printing software product.

Figure 2:
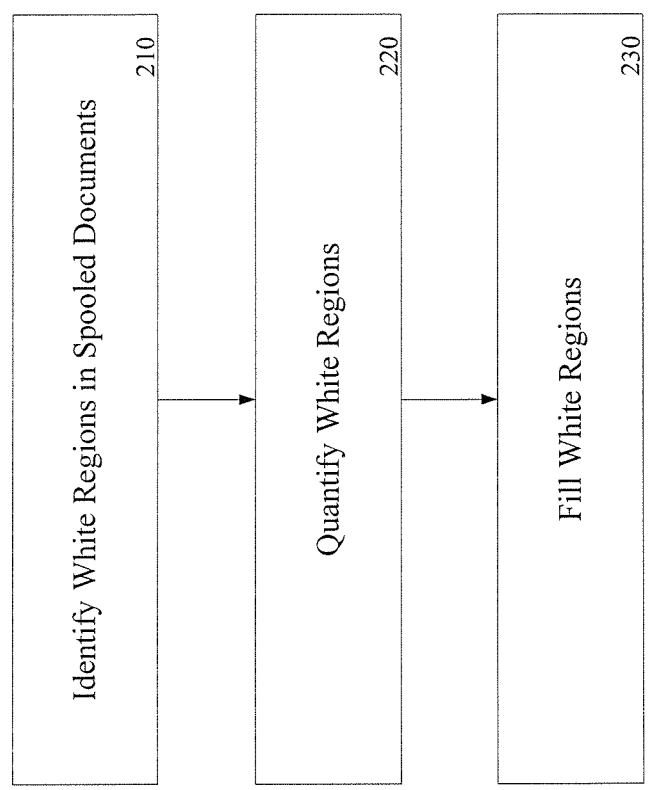
FIG. 2 is a flow diagram illustrating one embodiment of performing white space management.

FIG. 2 is a flow diagram illustrating one embodiment of a process performed on a document by a whitespace manager. At processing block 210, the whitespace manager identifies one or more white spaces on a print job spooled at the printing software product. In one embodiment, three types of white spaces may be identified. These include BLANK pages, FIXED spaces and SEARCH spaces. As will be described in greater detail below, the fixed and search spaces may involve operator interaction with the whitespace manager in order to identify regions of white space on a page.

At processing block 220, the identified white spaces are quantified. For instance, fixed white space regions are quantified in terms of the size and type of (e.g., text or image) content that may be placed within the white space. This quantification may subsequently be codified and stored. In one embodiment, a quantification value may be a number of characters of message text in a certain point size that would fit in the white space region, while in other embodiments it may include dimensions of an image that could fit within the region.

At processing block 230, one or more white space regions are filled with content. In one embodiment, a white space region may be filled with a predetermined message. However in other embodiments, dynamic messages may be used to fill a region based on variable data included on a document. For example, whitespace manager may analyze financial data included on a bank statement that is waiting to be printed. Based on the analysis whitespace manager may fill the white space region with content appropriate to a financial message corresponding to the analysis.

As discussed above, whitespace manager identifies BLANK pages, FIXED spaces and SEARCH spaces. Completely blank pages are one of the greatest sources of white space in current print applications. For instance, most duplex (e.g., N-up duplex) applications force the end of one client's statement in a manner that precludes any possibility of inadvertent exposure of the statement to another client.

Within AFP this process is implemented by an Eject to Front Facing (EFF). However, the process may also be implemented by adding actual blank pages to the application (e.g., padding any odd-pg statement to an even page count). A minor variant to the blank page is the "almost" blank page, which appears in a datastream, but provides no useful message content (e.g., "this page intentionally left blank" pages). Because of blank pages attributed to EFF and similar processes, a 25% increase of actual pages printed from pages of a print job file may occur. For example, a client application that includes all three page long statements may result in a result in a 75,000 page print file becoming ~100,000 pages at print time.

Therefore, the whitespace manager automatically identifies spaces where a blank page exists and fills the pages based upon one or more predetermined rules for indicating how the pages are to be filled with appropriate messages. According to one embodiment, the whitespace manager examines a print job data stream. In such an embodiment, the whitespace manager uses page data, mail piece breaks, duplex/simplex, and any advanced settings (e.g., constant back IMM) to identify the blank pages.

In embodiments using 2-up duplex (e.g., pages scaled to 2 pages per page using double-sided printing), odd-page-length documents are padded with a real page at the end of the document to preclude ejecting blank pages when the printer is handling the data. Thus, the whitespace manager normalizes all data streams to include an even number of page images so that each physical sheet of paper is filled front and back before being sent to the printer.

In other embodiments, pages are identified in existing legacy streams, such as "this page intentionally left blank" pages). Thus, blank pages may be identified by identification of a small area (e.g., the region in which that legacy text appears). If a page is found to be blank other than the specific region(s) identified, the page is deemed to be a "blank" page, and is swapped out in favor of a targeted message page. Other embodiments may include looking for a particular string on a page such (e.g., "this page intentionally left blank").

Once identified, blank pages are filled with a real page of messages based on user defined rules. In one embodiment, a message may include an entire pre-defined page that includes a static set of messages of interest to many clients. For example, a bank may add a simple 8.5×11 page that identifies current mortgage rates, CD rates, a website to visit, and/or other messages of potential interest.

In another embodiment, the identified blank page may be divided into a series of targeted messages including smaller coupons, messages, etc. In yet a further embodiment, the blank page may be filled with targeted trans-promotional messages tailored to a specific client, taking into account variable data included in the document. For instance, the variable data may include geographic region, value of the statement, and client preferences.

For FIXED space management, the whitespace manager is utilized by an operator to identify a fixed region on a page. In such an embodiment, the selected region is one that is known to be blank. Fixed space regions are often rectangular blank spaces within the top or bottom area of a page. However in further embodiments, other types of shaped regions may be identified and managed in a similar way (e.g., a circle could identify a suitable region for a circular message (image or text) to be placed on the page).

According to one embodiment, the operator identifies the region as suitable for white space message placement. In such an embodiment, identification of a region may be implemented using any reasonable method (e.g., Cartesian or Polar coordinates, etc.). However, in other embodiments identification is implemented using an interactive system against a visual image of a production file in order to identify a precise region to be managed as fixed white space. Within the whitespace manager this is done using a GUI and a mouse, against a visual representation of a page data for a particular application.

Once identified, the fixed regions are quantified in terms of the size of messages (text or image) that can be placed within them. As discussed above, the quantified data is then codified and stored. These stored quantified regions are subsequently combined with run-time business rules to enable the whitespace manager to fill the regions. Like for BLANK space management, a fixed region's dimensions are known in advance, which allows for messages to be tailored in advance to the specific size of the fixed spaces.

In one embodiment, a safety mechanism is constructed at run time. The mechanism checks the fixed space against the actual page data to make sure the region is actually blank. The mechanism may be performed in absolute terms by checking actual rendered images of page data, or in relative terms by allowing for underlying forms and logos via an overlay, to confirm that no text or foreground images occupy the fixed space region that is supposed to be blank. In a further embodiment, the safety mechanism includes error handling to provide an alert that the region is not blank. The error handling may include, for example, a simple warning message and suppression of an individual message placement, or raising an error condition since the region was identified by the operator as one that was supposed to be completely blank.

SEARCH space management is implemented in applications for which there is a region of a page that can be completely full, but is often only partially filled. This is common, for example, in billing applications where a particular region of a document is filled with bank transactions, stock trades, phone records, or other detailed line item data. This data is typically reported via one or more transactional pages filled with the billing details.

However, the last of the transactional pages, depending upon how precisely the actual transaction details fill the available space, often has some variable amount of blank space. Particularly, the last page usually includes a random distribution of 1–N transactions, thus leaving from zero to (N–1) rows of whitespace, where N is the maximum number transactions that may listed on the page.

In other instances, large regions of a page may be intended for text, but may not be entirely filled via an application that produces the data, thus leaving a white space. According to one embodiment, the whitespace manager identifies such white space in order to fill the space with appropriate messages.

As with the fixed spaces, SEARCH space management begins with an operator utilizing the whitespace manager to identify each region in a document that may include white space. In one embodiment, a region definition is checked against a sample/reference file to report a number of pages that include actual white space in a particular region, as well as the sizes of the white space. Thus, the whitespace manager enables interactive planning and assessment of a live production file for white space available within a certain region.

In a further embodiment, a rectangle is drawn around an entire region to be searched (e.g., a text portion of an automated letter application, a transactional data area, etc.) in order to identify a search region. As discussed above, other shaped regions types (circle, triangle, etc.) may be identified and managed. Subsequently, at run-time, the white space manager identifies an appropriate subset of the search space that would be available as white space for message placement.

Figure 3:
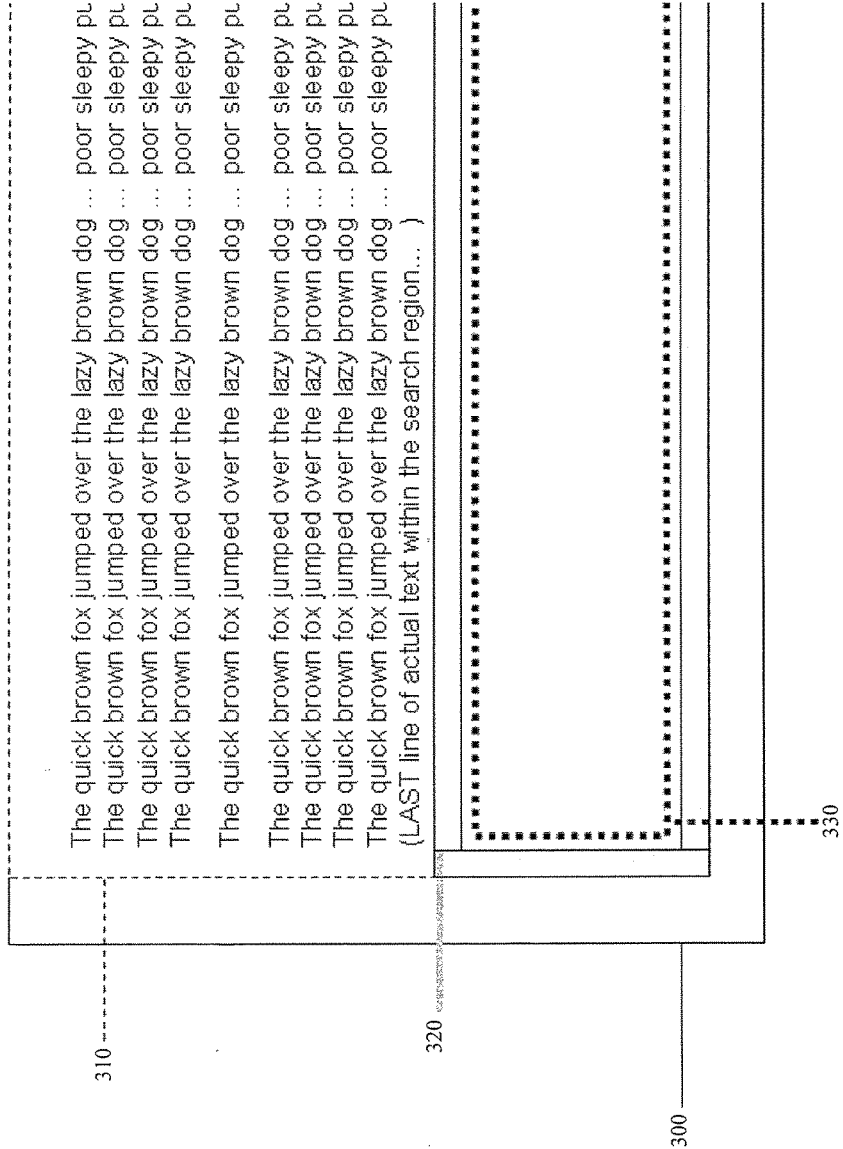
FIG. 3 illustrates one embodiment of searching for a white space.

As an example, if an identified 5.5"×4" area is found to have text in the top 1" only, an appropriate subset (e.g., 4.5"×4") will be identified as white-space. Such identification can also allow for margins, kerning, and other details. In this example, the region identified may be only 4"×4" if allowing for a 0.5" margin was desired to set whitespace messages apart. FIG. 3 illustrates one embodiment of searching for a white space on a page 300. As shown in FIG. 3, page 300 includes a search area 310 with margins 320. The whitespace manager searches page 300 until identifying white space 330 in search area 310, between margins 320.

Also during run time, search spaces are checked against the actual data within the file to assess if criteria for message placement are met, and if so, the regions may be filled with the desired message. As discussed above, business rules are used during run time to guide how each space is filled. In one embodiment a region is checked, during run time evaluation, against one or more bitmap planes of page images (e.g., in the CMYK (or color) or K (or black/white) planes) to make sure that no text or image intrudes upon the space.

However in other embodiments, text or image messages may be placed on top of an overlay or other type of "image" even if some background pixels occur within the search space. Therefore, the whitespace manager may look for page text that lands within a region at a current time. In a further embodiment, the whitespace manager stores an image of all documents for which white space has been filled in order to include a precise record of the appearance of messages placed on each document.

FIGS. 4A-4H are screen shots of various embodiments of a GUI showing a GUI 120 AFP whitespace manager 400.

Figure 4A:
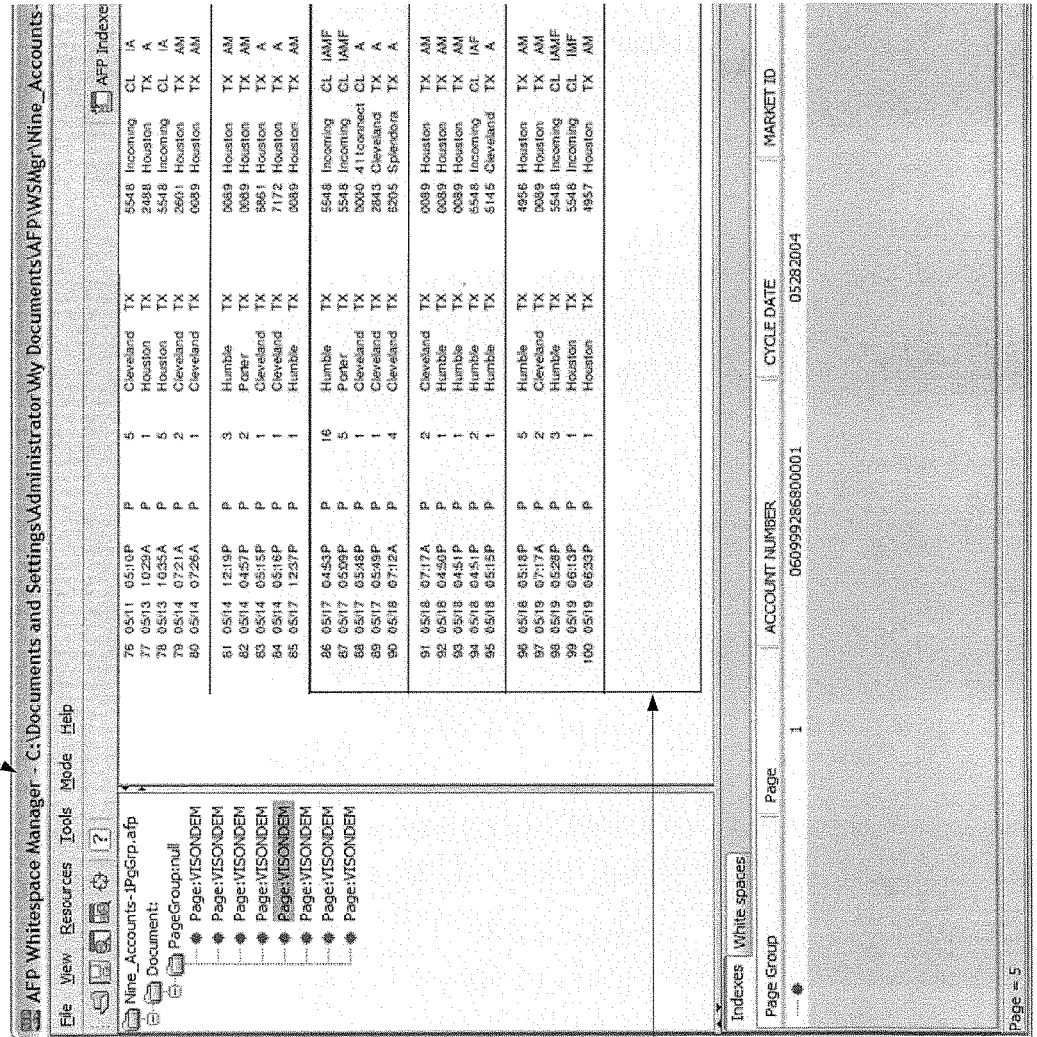
FIGS. 4A-4H are screen shots of various embodiments of a GUI.
Figure 4B:
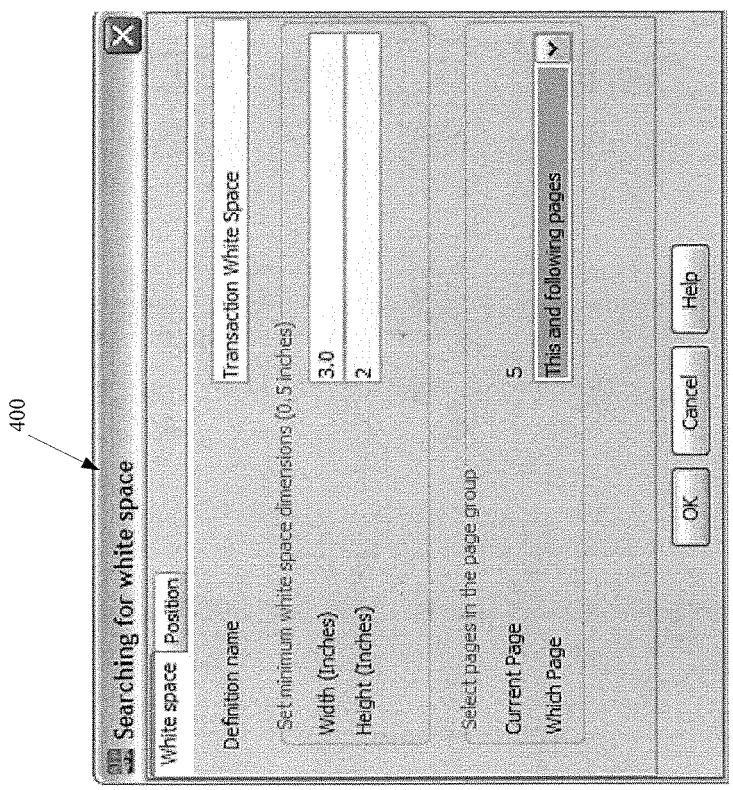
Figure 4C:
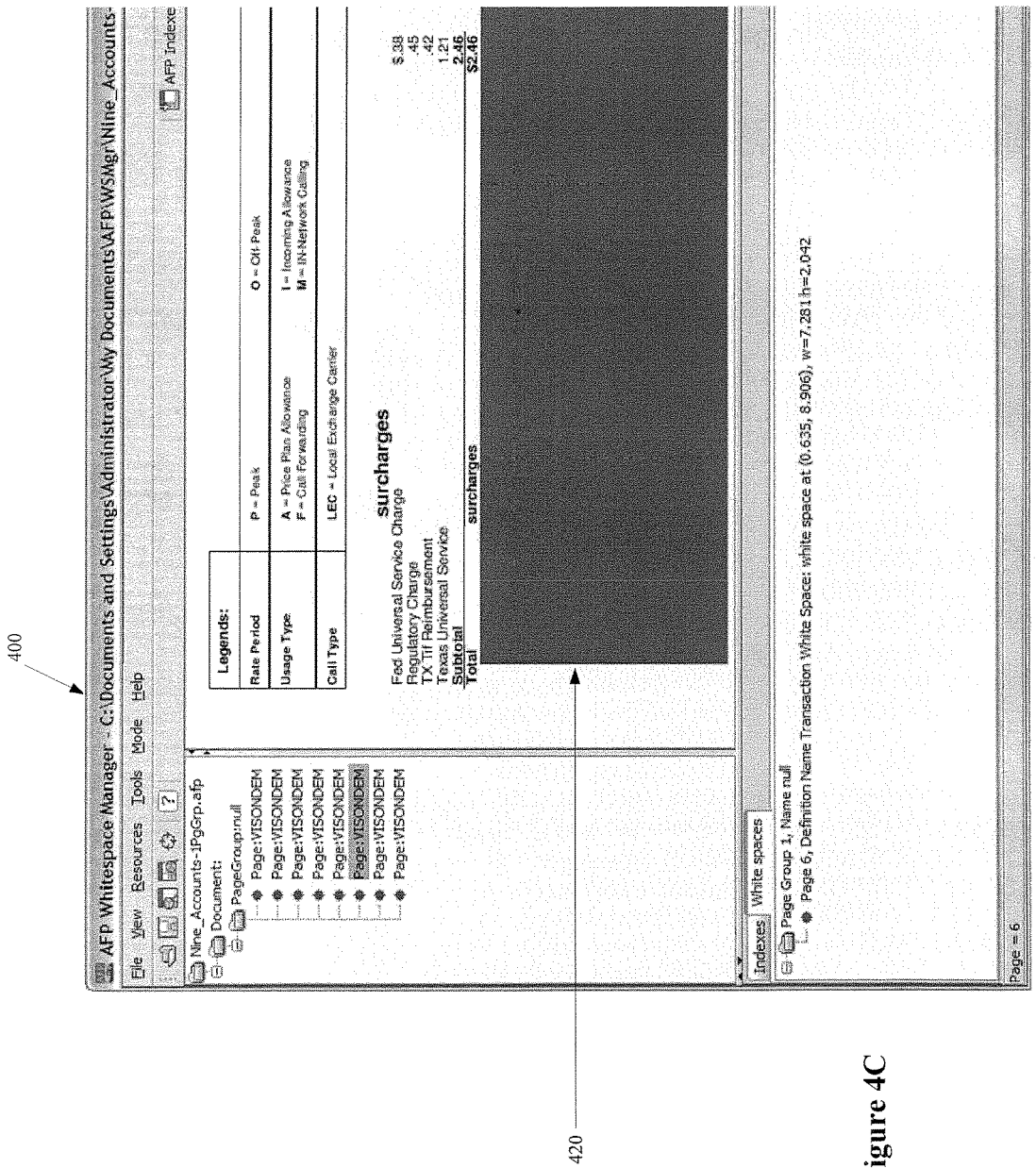

FIG. 4A illustrates a screen shot of one embodiment whitespace manager 400 having a region 410 that is selected in a transactional page of phone billing details to search in subsequent pages of a document. FIG. 4B illustrates a screen shot of another embodiment of whitespace manager 400 which enables an operator to define rules for the white space. For instance, an operator may set minimum white space dimensions to search for, as well as select which pages to search. FIG. 4C illustrates a screen shot of an embodiment of whitespace manager 400 showing the results of the search. As shown in FIG. 4C, a region 420 matching the criteria of the search has been found. Further, a bottom pane of whitespace manager 400 provides the details of the white space region.

Figure 4D:
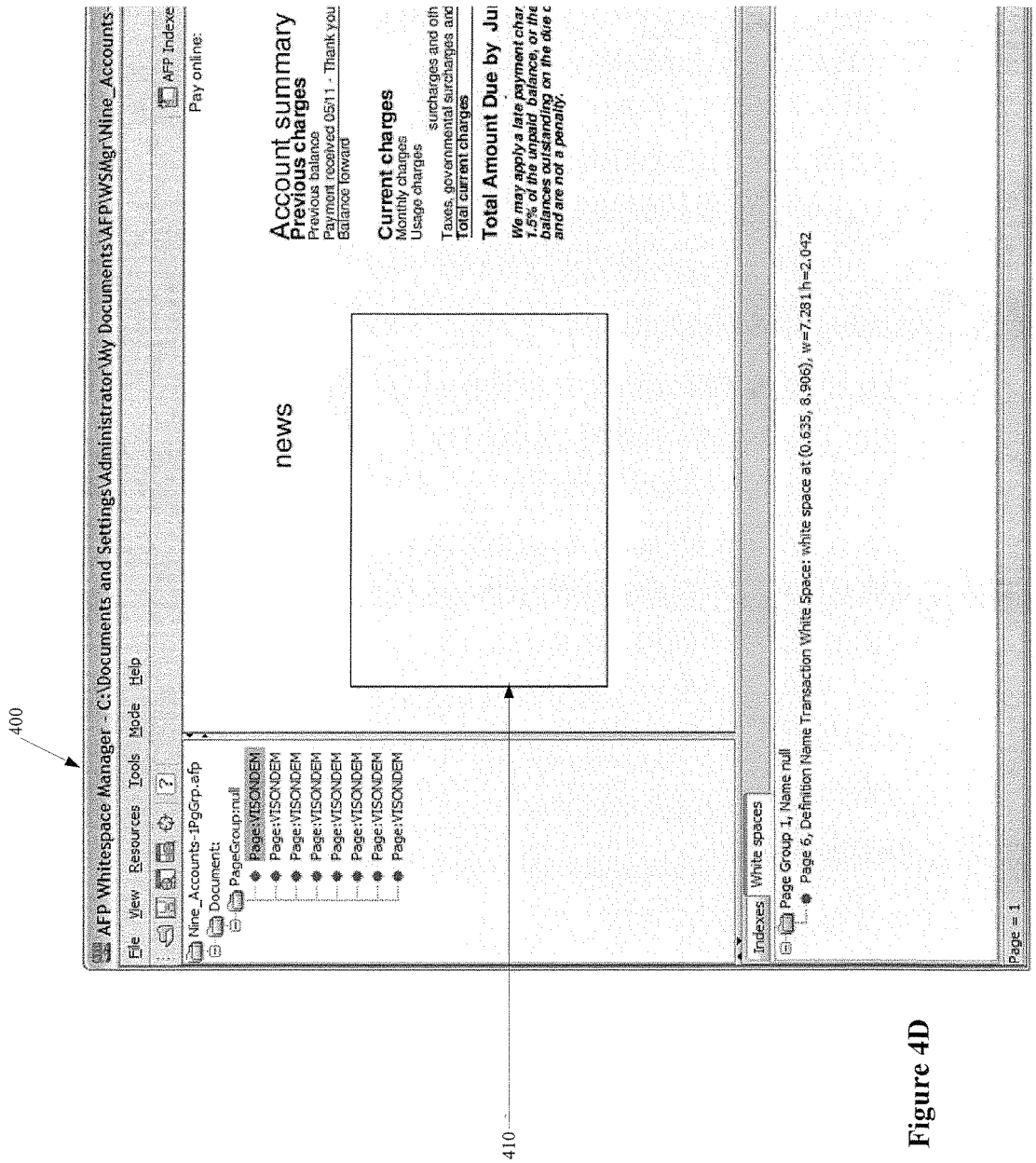
Figure 4E:
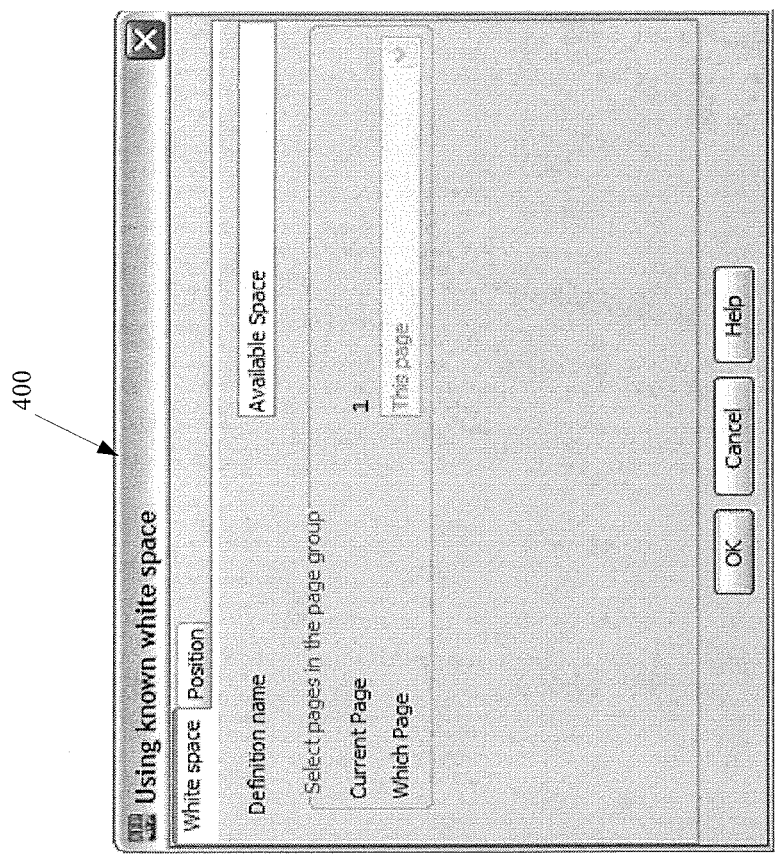
Figure 4F:
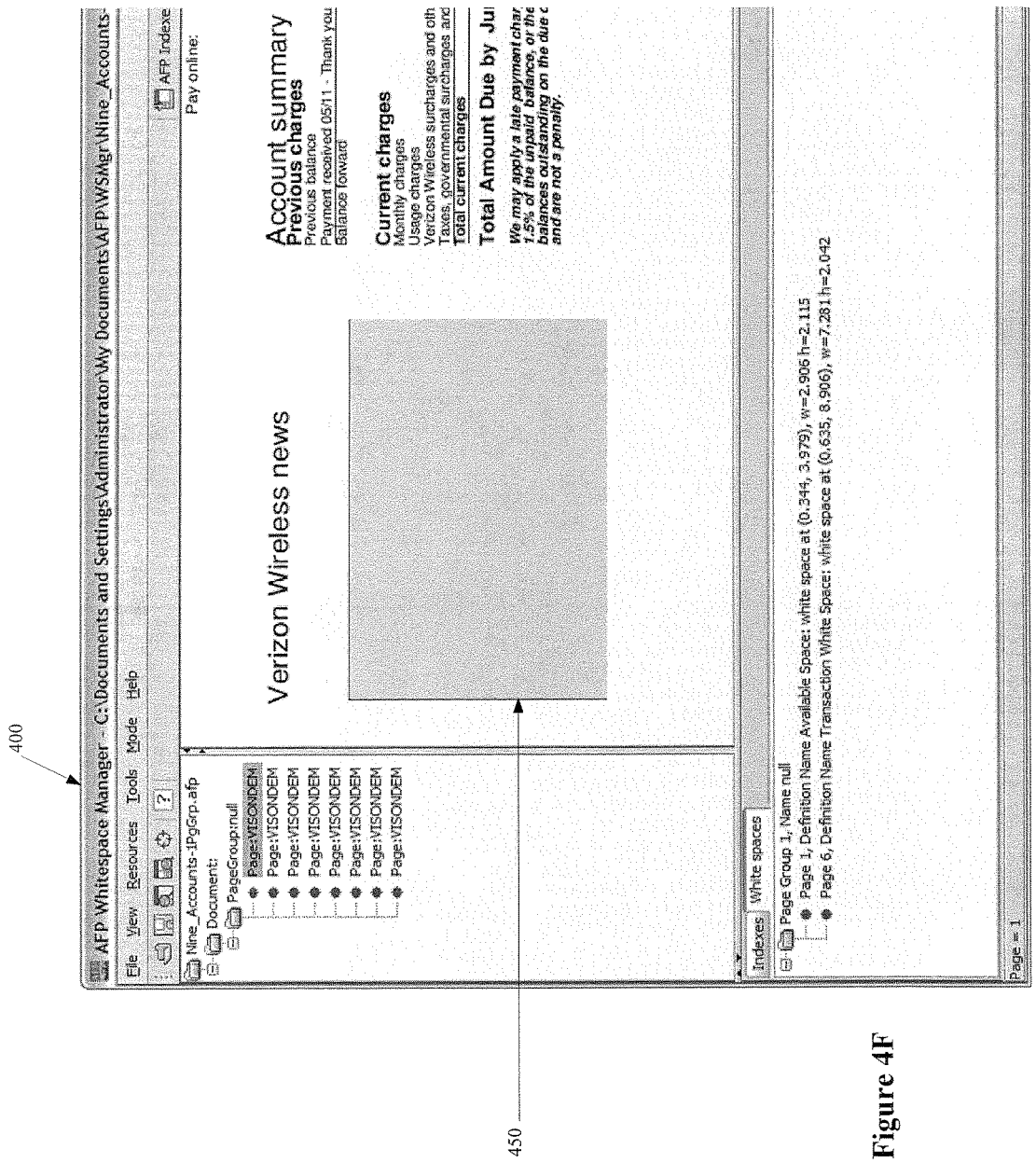

FIG. 4D illustrates a screen shot of one embodiment whitespace manager 400 in which region 410 is a known white space region. FIG. 4E illustrates a screen shot of an embodiment of the rules definition page of whitespace manager 400 corresponding to the selection of the known white space region. FIG. 4F illustrates a screen shot of an embodiment of whitespace manager 400 showing a region 450 resulting from search results from selecting a known region selection. Further, the bottom pane of whitespace manager 400 provides a list, along with the details of the found white space regions.

Figure 4G:
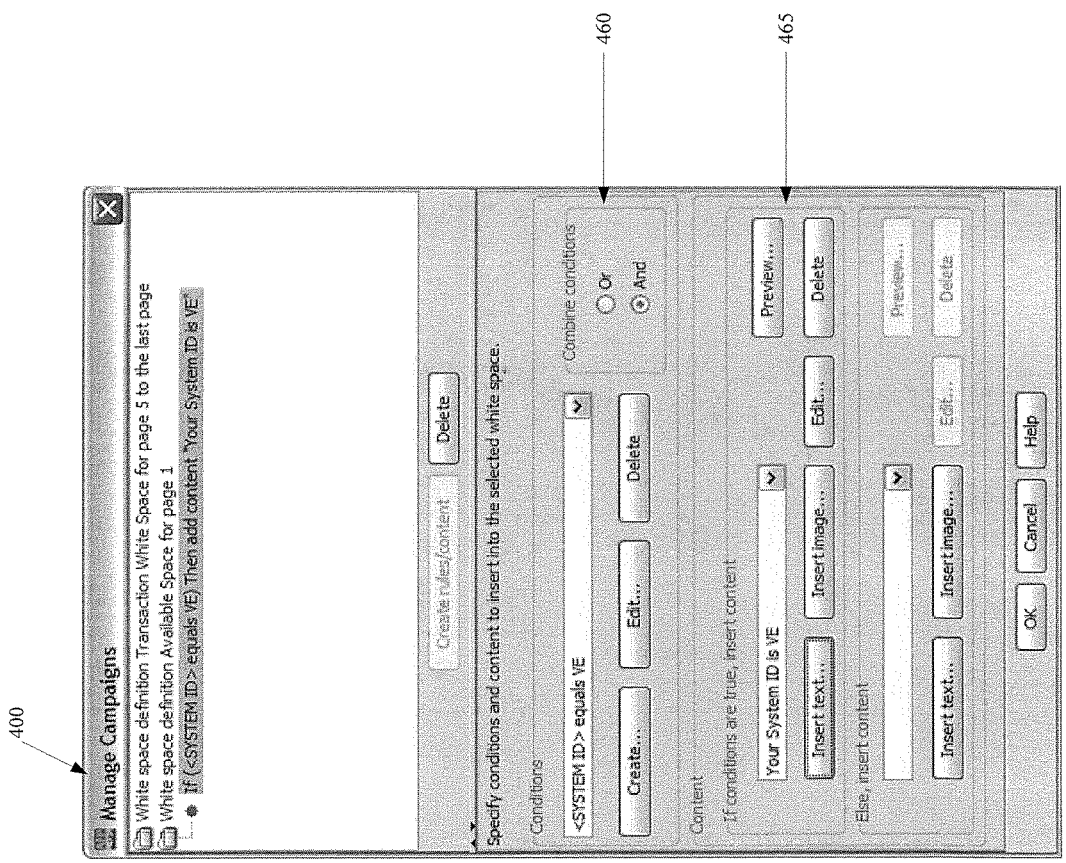
Figure 4H:
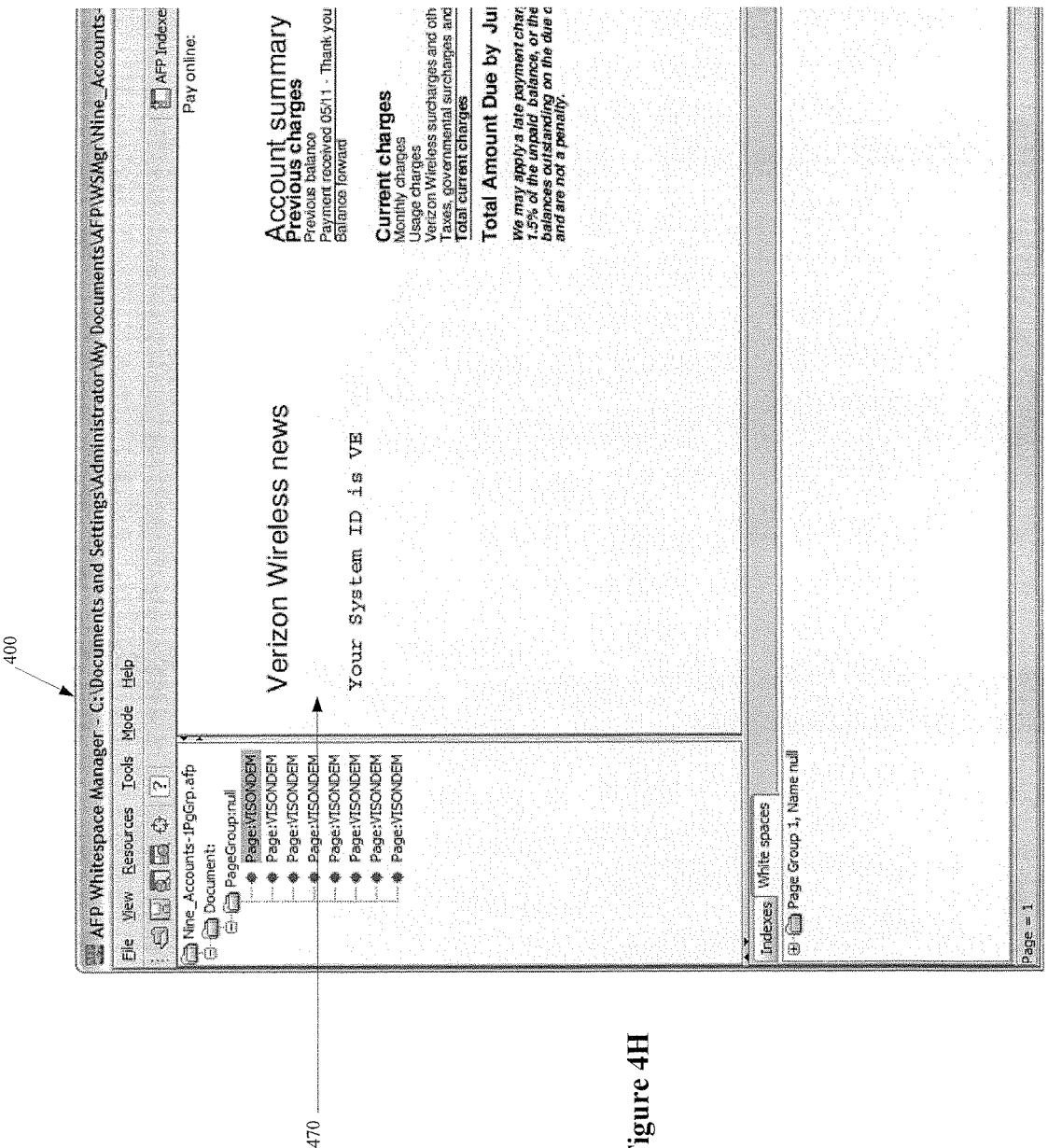

FIG. 4G illustrates a screen shot of one embodiment whitespace manager 400 used for specifying rules for adding content to the found white space regions. As shown in FIG. 4G, whitespace manager 400 includes conditions section 460 and content section 465, each including various buttons and menus to establish conditions and content for filling white space regions. For instance, an operator may enter text to be inserted to a whitespace region upon conditions entered in section 460 being met. According to one embodiment, each whitespace region has its own set of rules. FIG. 4H illustrates a screen shot of an embodiment of whitespace manager 400 showing region 450 being filled with text 470 resulting from the text entered in content section 465.

Figure 5:
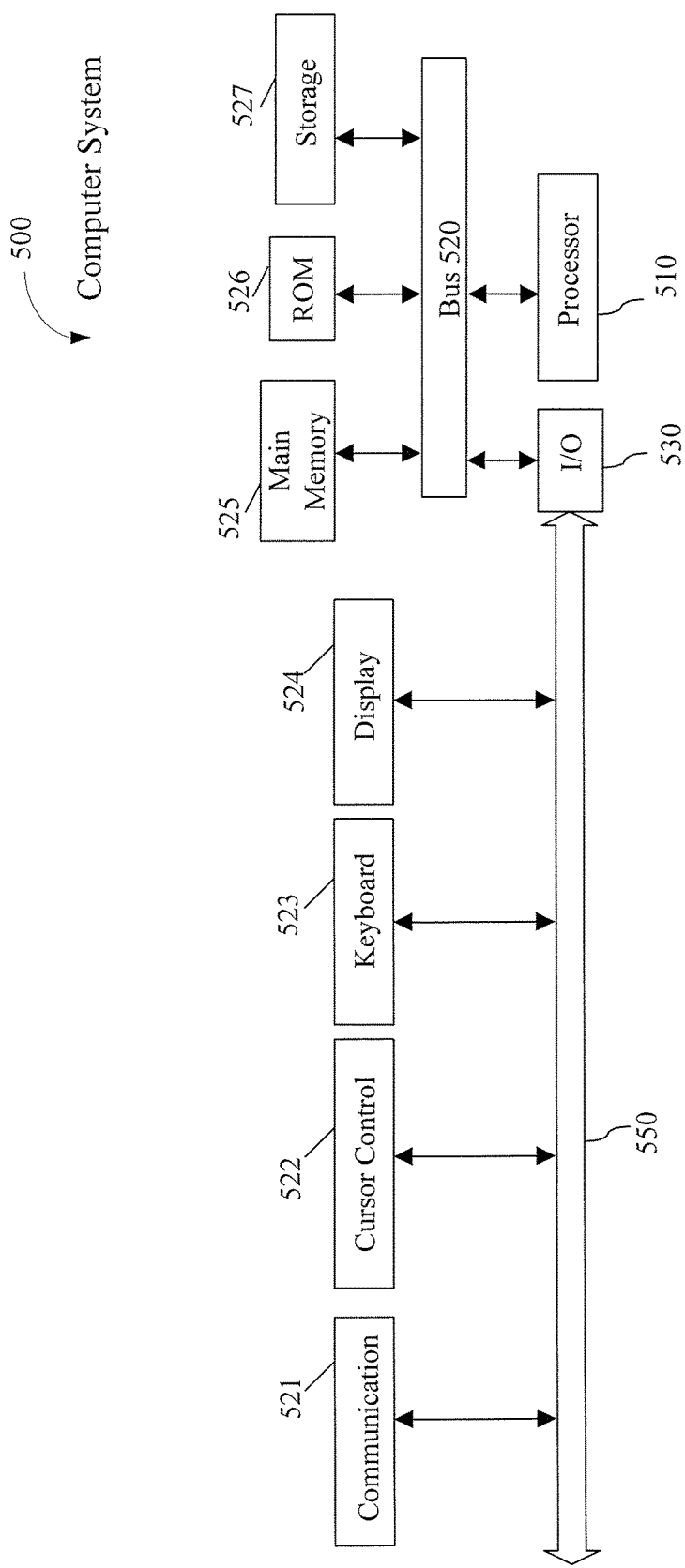
FIG. 5 illustrates one embodiment of a computer system.

FIG. 5 illustrates a computer system 500 on which data processing system 102 and/or server 108 may be implemented. Computer system 500 includes a system bus 520 for communicating information, and a processor 510 coupled to bus 520 for processing information.

Computer system 500 further comprises a random access memory (RAM) or other dynamic storage device 527 (referred to herein as main memory), coupled to bus 520 for storing information and instructions to be executed by processor 510. Main memory 527 also may be used for storing temporary variables or other intermediate information during execution of instructions by processor 510. Computer system 500 also may include a read only memory (ROM) and or other static storage device 526 coupled to bus 520 for storing static information and instructions used by processor 510.

A data storage device 525 such as a magnetic disk or optical disc and its corresponding drive may also be coupled to computer system 500 for storing information and instructions. Computer system 500 can also be coupled to a second I/O bus 550 via an I/O interface 530. A plurality of I/O devices may be coupled to I/O bus 550, including a display device 524, an input device (e.g., an alphanumeric input device 523 and or a cursor control device 522). The communication device 521 is for accessing other computers (servers or clients). The communication device 521 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting.

Therefore, references to details of various embodiments are not intended to limit the scope of the claims, which in themselves recite only those features regarded as essential to the invention.

What is claimed is:

1. A computer generated method comprising:
examining a print job data stream spooled in a spooled print production file;
identifying one or more white space regions within documents in the print production file;
quantifying each of the white space regions to establish a type and size of the content to be inserted into each white space region; and
inserting content into each of the white space regions based on one or more rules associated with each white space region indicating messages that are to be included, wherein the rules indicate that a dynamic message is to be inserted into a white space region based upon variable data included in the print job data stream for a document on which the white space region is located.

2. The method of claim 1 wherein the rules further indicate that a predetermined message is to be inserted into a white space region.

3. The method of claim 1 wherein a white space region is quantified as a blank page region.

4. The method of claim 3 wherein the blank page region is identified using page data within the print production file.

5. The method of claim 3 wherein the blank page region is identified using legacy streams within the print production file.

6. The method of claim 1 wherein a white space region is a fixed white space region in one or more documents in the print production file is known to be blank.

7. The method of claim 6 wherein the fixed white space region is identified using coordinates.

8. The method of claim 6 wherein the fixed white space region is identified using a graphical user interface to access an image of the print production file.

9. The method of claim 6 further comprising comparing the fixed white space region to page data to determine if the fixed white space region is blank.

10. The method of claim 1 wherein a white space region is a search white space region in one or more documents in the print production file that is identified by searching regions in documents that have variable white space regions.

11. The method of claim 10 wherein the identifying the search white space region comprises:
selecting a search region; identifying a subset of the search region available for
content placement; and comparing the subset of the search region to the print
production file to determine if content placement is available.

12. A print server comprising a printing software product having a whitespace manager to examine a print job data stream spooled in a spooled print production file stored at the server, identify one or more white space regions within documents in the print production file, quantify each of the white space regions to establish a type and size of the content to be inserted into each white space region and insert content into each of the white space regions based on one or more rules associated with each white space region indicating messages that are to be included, wherein the rules indicate that a dynamic message is to be inserted into a white space region based upon variable data included in the print job data stream for a document on which the white space region is located.

13. The print server of claim 12 wherein the rules further indicate that a predetermined message is to be inserted into a white space region.

14. The print server of claim 12 wherein a white space region is a blank page region.

15. The print server of claim 12 wherein a white space region is a fixed white space region in one or more documents in the print production file is known to be blank.

16. The print server of claim 15 wherein the fixed white space region is identified using a graphical user interface to access an image of the print production file.

17. The print server of claim 12 wherein a white space region is a search white space region in one or more documents in the print production file that is identified by searching regions in documents that have variable white space regions.

18. The print server of claim 17 wherein the whitespace manager identifies by selecting a search region, identifying a subset of the search region available for content placement and comparing the subset of the search region to the print production file to determine if content placement is available.

19. An article of manufacture comprising a non-transitory machine-readable medium including data that, when accessed by a machine, cause the machine to perform operations comprising:
examining a print job data stream spooled in a spooled print production file;
quantifying each of the white space regions to establish a type and size of the content to be inserted into each white space region; and
inserting content into each of the white space regions based on one or more rules associated with each white space region indicating messages that arc to be included, wherein the rules indicate that a dynamic message is to be inserted into a white space region based upon variable data included in the print job data stream for a document on which the white space region is located.

20. The article of manufacture of claim 19 wherein the rules further indicate that a predetermined message is to be inserted into a white space region.

* * * * *